United States Patent [19]
Gonidec et al.

[11] Patent Number: 6,122,892
[45] Date of Patent: Sep. 26, 2000

[54] VENTILATED HONEYCOMB CELL SANDWICH PANEL AND VENTILATION PROCESS FOR SUCH A PANEL

[75] Inventors: Patrick Gonidec, Sainte Adresse; Thierry Jacques Albert Le Docte, Harfleur; Guy Bernard Vauchel, Le Havre, all of France

[73] Assignee: Societe Hispano-Suiza, Paris, France

[21] Appl. No.: 08/906,212

[22] Filed: Aug. 5, 1997

[30] Foreign Application Priority Data

Aug. 14, 1996 [FR] France .................................. 96 10195

[51] Int. Cl.⁷ .................................................... E04C 2/34
[52] U.S. Cl. .......................................... 52/793.1; 428/116
[58] Field of Search ...................... 52/791.1, 790.1, 52/793.1; 428/116

[56] References Cited

U.S. PATENT DOCUMENTS

| | | |
|---|---|---|
| 3,380,552 | 4/1968 | Segil et al. . |
| 4,084,366 | 4/1978 | Sayloer ..................................... 52/615 |
| 5,022,943 | 6/1991 | Zaima et al. . |
| 5,180,619 | 1/1993 | Landi ....................................... 428/116 |
| 5,540,972 | 7/1996 | Jaegers .................................... 428/116 |
| 5,543,198 | 8/1996 | Wilson ..................................... 428/116 |
| 5,804,030 | 9/1998 | Jaegers .................................... 52/793.1 |

FOREIGN PATENT DOCUMENTS

| | | |
|---|---|---|
| 913 070 | 8/1946 | France . |
| 2 080 347 | 11/1971 | France . |
| 2 128 939 | 10/1972 | France . |
| 1 353 468 | 5/1974 | United Kingdom . |
| 2 096 535 | 10/1982 | United Kingdom . |
| WO 88/06970 | 9/1988 | WIPO . |

*Primary Examiner*—Beth A. Stephan
*Attorney, Agent, or Firm*—Oblon, Spivak, McClelland, Maier & Neustadt P.C.

[57] ABSTRACT

A cell panel for thermal ventilation including a first wall having raised portions which define openings; a second wall; partition walls connected to the first and second walls and that define cells. The openings in the first wall are located upstream of an air flow flowing outside the first wall. The first wall may further include raised portions which define other openings located downstream of the air flow. The second wall may also include raised portions which define openings located downstream of the air flow. The partition walls may define communication holes between adjacent cells.

20 Claims, 5 Drawing Sheets

VENTILATED HONEYCOMB CELL SANDWICH PANEL AND VENTILATION PROCESS FOR SUCH A PANEL

FIELD OF THE INVENTION

This invention concerns the ventilation of a large number of honeycomb cell type sandwich panels. This includes, in particular, the sandwich panels used in the engine pods of turbojet engines, for example to form the fixed sections of the thrust inverters which surround the engine. However, the invention may be used in any field where honeycomb cell sandwich panels are used, particularly in difficult thermal environments, such as energy production, automobiles or other means of transport.

PRIOR ART AND THE PROBLEM POSED

In general, in turbojet engines, two air flows pass through the engine longitudinally. A primary or hot flow passes through the engine via the combustion chamber. The secondary or cold flow is compressed by a blower driven by the energy developed by the primary flow. It is thus compressed and accelerated in a stream called the "secondary stream" or "cold flow channel" which surrounds the hot flow. The central part of this secondary annular stream surrounds the turbojet engine and forms the engine cowl. It has four functions, which are as follows:

to guide the cold flow;
   to evacuate the heat flow radiated by the engine by transmitting it via forced convection to the cold flow;
   to allow a small part of the cold flow to be used to ventilate the engine compartment; and
   to reduce the noise of the engine and the blower by means of perforations in the skin of the sandwich panel that is in contact with the cold flow.

Due to its position and the operating conditions, this structure must withstand the difference in pressure between the cold flow and the engine compartment. This means that it needs to be structurally stable. For this purpose, most of the time honeycomb cell type sandwich panels are used.

The sandwich panels are generally composed of two metal or composite walls or skins and a central section made from metal or composite honeycomb cell material. In certain cases, the cells of the honeycomb material act as a Helmholtz resonator when they communicate with the outside. This thus provides an acoustic panel which absorbs the noise over a certain range of frequencies.

When such acoustic panels are used to form the wall between the hot and cold flows of a turbojet engine, this wall is not cooled and its mechanical integrity is only ensured by a thermal protection device installed in the engine compartment.

FIG. 1 shows such a structure featuring a first external wall 11E, a second internal wall 11I, partitions 12, which are perpendicular to the two internal 11I and external 11E walls. The latter are thus referenced 11E and 11I as they form the internal and external walls of the panel when it is used as a partition to separate the cold flow and the engine casing of a turbojet engine. Orifices 13 are provided in the first external wall 11E in order to form an acoustic panel. The internal protection 14 is placed against the external surface of the internal wall 11I.

The same is also true for all sandwich panels subject to a high thermal flow which therefore require thermal protection. This implies the use of an additional mass, which may also be delicate to install. Furthermore, the fact that this thermal protection is relatively expensive must also be taken into consideration.

The aim of the invention is to overcome this disadvantage by proposing a honeycomb cell type sandwich panel, which may be acoustic for example, but which is cooled or ventilated.

SUMMARY OF THE INVENTION

To this end, a first main object of the invention is a ventilation process for a honeycomb cell sandwich panel, consisting of circulating air through some of these cells.

A second main object of the invention is a honeycomb cell sandwich panel comprising of:
   two parallel external walls;
   internal partitions attached to the external walls and placed in the middle of these two external walls to form honeycomb cells.

In accordance with the invention, each honeycomb cell to be ventilated has at least two holes which form a ventilatory connection with the outside.

In a first embodiment of the panel in accordance with the invention, the honeycomb cells to be ventilated have a hole on each external wall.

In a second embodiment, a first honeycomb cell has a first hole in a first external wall and a second hole in an internal partition common to a second honeycomb cell, which has at least one ventilatory connection with the outside. In this last case, a first possibility consists of the ventilatory connection being formed by a hole in the partition with a third honeycomb cell or an nth honeycomb cell which also has a ventilatory connection with the outside, to create a circulation of air between the two skins of the sandwich. This forced circulation is moved either by the difference in pressure between the stream and the engine compartment, or by the difference in pressure between the inlet and outlet holes which both open onto the stream. In this last case, a sufficient number of honeycomb cells are perforated so as to use the pressure gradient along the second flow to obtain the desired effect.

A second possibility consists of the ventilatory connection having a hole through the first external wall.

A third possibility consists of this ventilatory connection being formed by means of a hole in the second external wall.

In a third embodiment of the panel in accordance with the invention, a part may be used which is incorporated in the panel, with two external walls which substitute the external walls of the panel, at least two internal partitions which substitute the internal partitions of the panel and which create at least one honeycomb cell to be ventilated, which has a hole in each external wall in a same honeycomb cell to be ventilated.

A particular embodiment of the holes in the external walls consists of making some of them oblique in each of the external walls.

A second possible embodiment of the holes in the external walls consists of making some of them in an internal partition which separates the two honeycomb cells.

In the case of the air circulating longitudinally along both sides of the panel, the ventilatory connection between the first external wall and the second is by means of holes in the first wall placed upstream of the holes in the second external wall.

It is possible to improve the shapes of the different holes. The inlet holes in the first external wall may be bell mouthed to improve the inlet flow of the air.

In this case, the inlet holes will preferably be punched, with the external wall punched in towards the inside.

Similarly, the holes in the internal partitions may be bell mouthed to improve the air flow.

In this case, the holes in the internal partition walls will preferably be punched so that they have a slight lip downstream to improve the air flow.

It is also possible for the inlet holes in the first wall to be scoop shaped, with the first external wall raised outwards on the upstream side of the outlet hole.

Similarly, the ventilatory connections with the outside of the panel may be scoop shaped outlet holes, with the external wall raised on the downstream side of the outlet hole.

LIST OF FIGURES

The invention and its various characteristics will be better understood upon reading the following description, accompanied by several Figures respectively showing in cross section;

FIG. 1, a honeycomb cell sandwich panel in accordance with the prior art;

FIG. 2, a first embodiment of the sandwich panel in accordance with the invention;

FIG. 3, a second embodiment of the sandwich panel in accordance with the invention;

FIG. 4, a third embodiment of the sandwich panel;

FIG. 5, a fourth embodiment of the sandwich panel in accordance with the invention;

FIG. 6, a fifth embodiment of the sandwich panel in accordance with the invention;

FIG. 7, a sixth embodiment of the sandwich panel in accordance with the invention with a part incorporated;

FIG. 8, a seventh embodiment of the sandwich panel in accordance with the invention;

FIG. 9, an eighth embodiment of the sandwich panel in accordance with the invention;

FIG. 10, a ninth embodiment of the sandwich panel in accordance with the invention;

FIG. 11, a tenth embodiment of the sandwich panel in accordance with the invention;

FIG. 12, an eleventh embodiment of the sandwich panel in accordance with the invention;

FIG. 13, a twelfth embodiment of the sandwich panel in accordance with the invention;

FIG. 14, a thirteenth embodiment of the sandwich panel accordance with the invention; and FIG. 15, a perspective view of a cell in a panel shown by FIG. 14.

DETAILED DESCRIPTION OF THE EMBODIMENTS OF THE INVENTION

Figure 1:
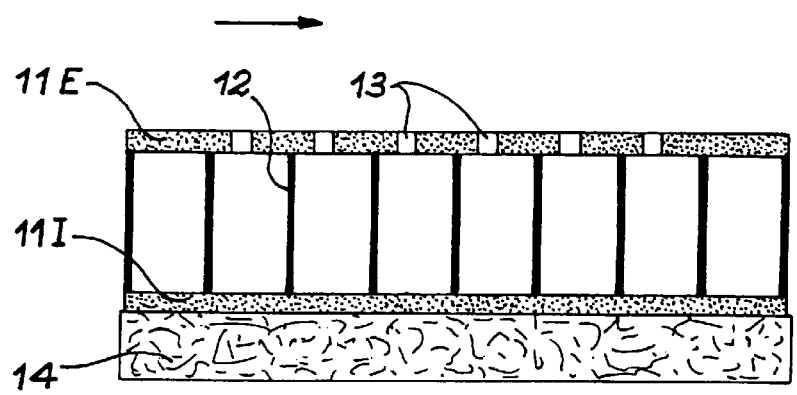
Figure 2:
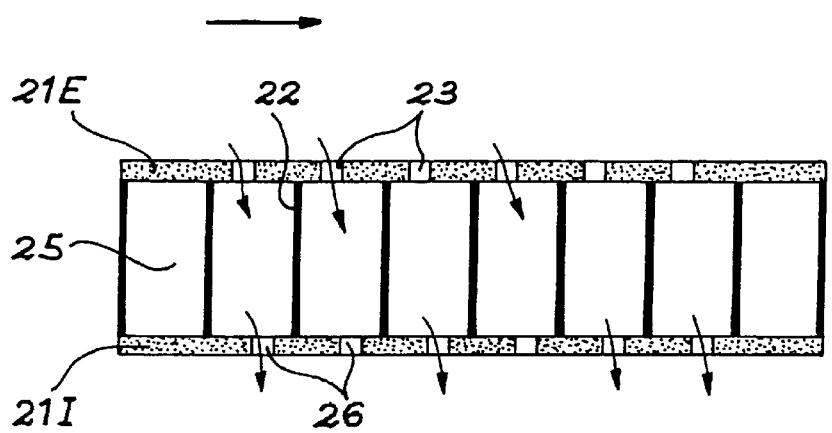

With reference to FIG. 2, the simplest embodiment of the sandwich panel in accordance with the invention consists of conserving the holes 23 in the first external wall 21E, there being one hole for each honeycomb cell. In other words, between each internal partition 22, there is a hole 23 in the first wall 21E. Correspondingly, there is a hole 26 in the second wall 21I which corresponds to each hole 23 in the first wall 21E, for each honeycomb cell 25.

It is thus understood that an air flow may circulate both sides of the sandwich panel, as shown by the arrows. In fact, the compartment surrounding the engine is generally at a lower pressure than the secondary stream. Furthermore, if, as is the case for the wall which separates the cold flow from the hot stream in a turbojet engine, there are two longitudinal circulations of air either side of the sandwich panel, it may be wise to slightly offset the holes 23 and 26 with respect to each another in each honeycomb cell. In fact, it is supposed that these two longitudinal air flows circulate from left to right along the panel, as shown by the horizontal arrow, and that the air circulation through the panel goes from top to bottom, which is to say from the first external wall 21E to the second external wall 21I. In this case, to improve this transversal circulation, the holes 23 in the external wall 21E are positioned at the beginning of the portion of the first external wall 21E for each honeycomb cell 25.

Correspondingly, the holes 26 of the second external wall 21I are positioned at the end of each corresponding portion of the first external wall 21I for each honeycomb cell 25. It is thus understood that the circulation through the sandwich panel is favoured from top to bottom, as a slight longitudinal component from right to left is conserved when the air passes through the sandwich panel.

Figure 3:
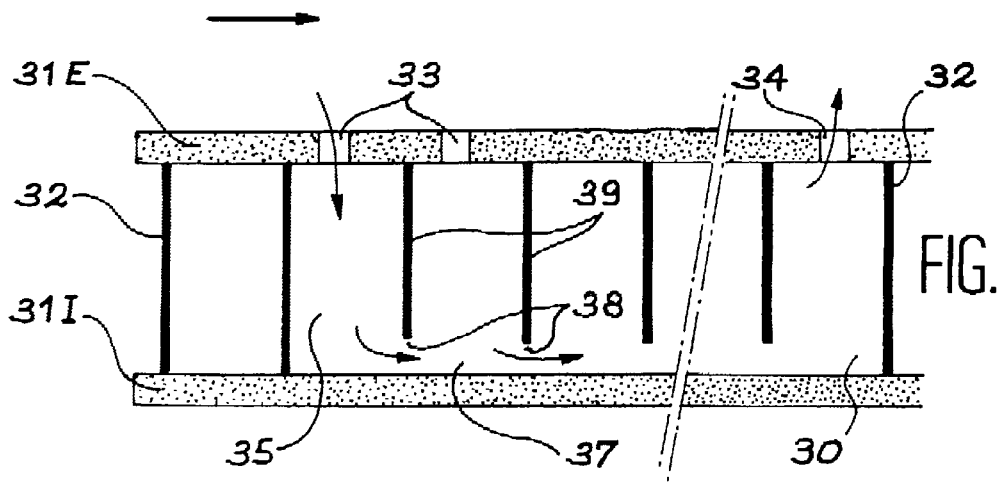

With reference to FIG. 3, a second solution consists of conserving the holes 33 and 34 in the first external wall 31E, at least for certain honeycomb cells 35, and making additional holes 38 in one or more internal partitions 39 to cause ventilatory circulation between two adjacent honeycomb cells 35 and 37, whose common partition 39 has a hole 38 in it. It is thus understood that the circulation of air can enter a honeycomb cell 35 to pass through a set of several following honeycomb cells 37 and leave either by a hole 34 in the first external wall 31E, or by a hole, not shown, in the second external wall 31I. When communicating holes 38 are used between adjacent honeycomb cells, this consequently favours transversal drainage of the honeycomb cells. In this solution, some internal partitions 32 do not have holes in the skins of the sandwich. This embodiment uses the change in static pressure along the walls of the pod. The holes are situated downstream of the inlet holes, excepting single specific geometrical layouts.

Figure 4:
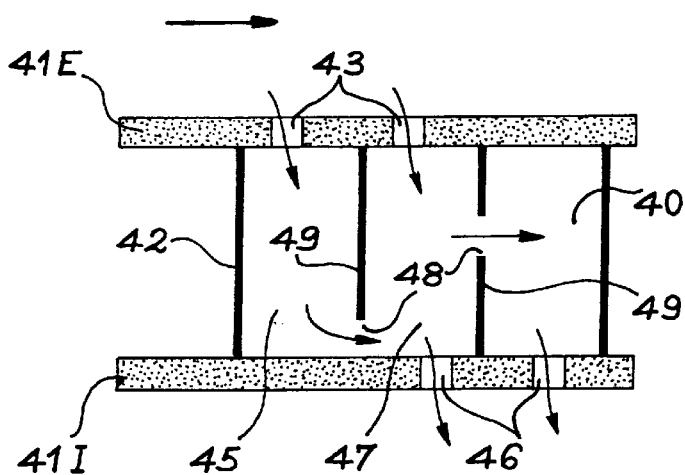

With reference to FIG. 4, a third embodiment of the invention combines the first two, shown by FIGS. 2 and 3. In fact, there are the holes 43 in the first external wall 41E, the holes 46 in the second external wall 41I and holes 48 in some of the internal partitions 49. Several types of ventilatory circulation may thus be organized through the panels. For example, a first type may start via a hole 43 in the first external panel 41E, open into a first honeycomb cell 45 which communicates via a hole 48 in an internal partition 49 with a second honeycomb cell 47. The latter may have both a hole 46 in the second external wall 41I to create an outlet for the air, and a second hole 48 in an internal partition 49 which opens into a third honeycomb cell 40, which has a single hole 46 in the second external wall 41I. It may be noted that the second honeycomb cell 47 may also have a hole 43 in the first external wall 41E to create a second air inlet into the panel.

Figure 5:
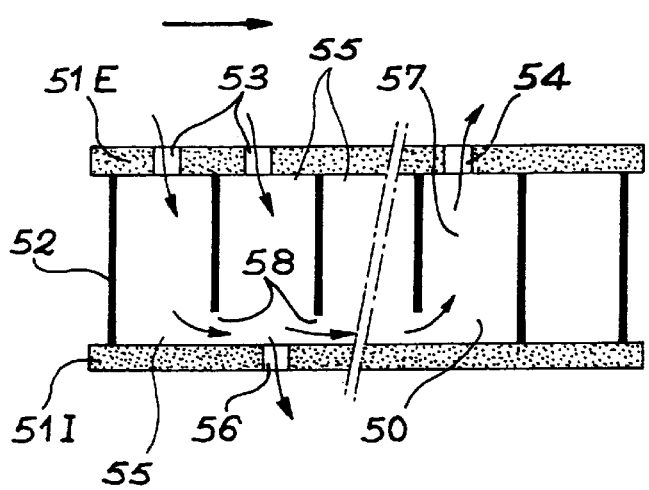

FIG. 5 shows a fourth embodiment which has features in common with FIG. 4, but also incorporates an additional solution as concerns the ventilation path possible through the panel.

In fact, there are the same holes 53 in the first external wall 51E which open into honeycomb cells 55, each with a communication hole 58 with their respective adjacent honeycomb cell. There is also the same outlet hole 56 in the second external wall 51I.

However, several adjacent honeycomb cells 57 have a communication hole 58, such that the air circulation through the panel can continue inside it up to a last honeycomb cell 50, which only has one communication hole 58, which is situated downstream in relation to the general circulation of air around the panel, represented by the arrow on the outside of it. However, it also has a hole 54 in the first external wall 51E, thus permitting part of the ventilatory flow to exit by the same side as that where it entered.

Figure 6:
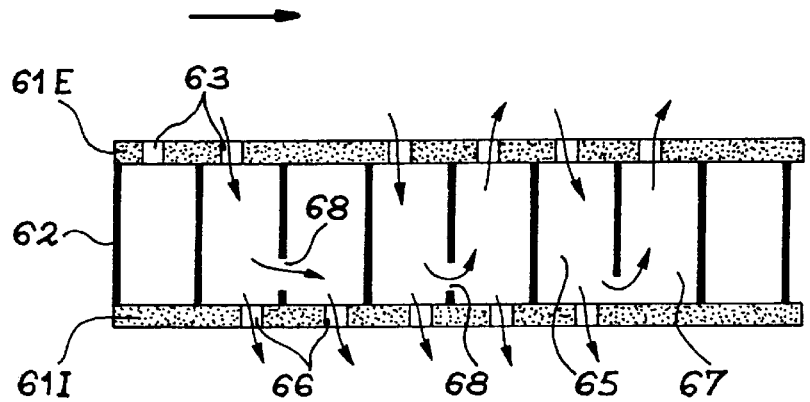

FIG. 6 depicts a fifth embodiment, which is a combination of the various, previously described embodiments. In fact, there are holes 63 in the first external wall 61E, such that the ventilatory flow may enter and leave. Outlet holes 66 are provided in the second external wall 61I. Furthermore, communication holes 68 are provided between two adjacent honeycomb cells 65 and 67. The second honeycomb cell 67 has, in this case, a hole 63 in the first external wall 61E for the gas to leave via the same side as that where it entered.

It may be noted that, in all of these embodiments, the panel may have honeycomb cells where there is no circulation of air.

Figure 7:
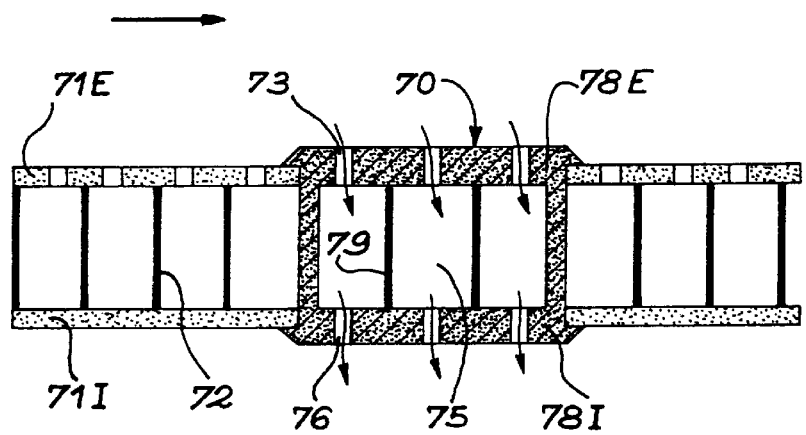

The embodiment depicted by FIG. 7 is another type, as it uses an incorporated part 70. In fact, the panel has, of known type, a first external wall 71E with holes which are usually to be found in such a panel. The honeycomb cells 72, positioned between the first external wall 71E and the second external wall 71I of the panel, therefore do not have air circulating through them. However, the incorporated part 70 also has a first external wall 78E and a second external wall 78I which replace, at the position where the part 70 is installed in the panel, the external walls 71E and 71I of the panel. They are a little thicker, but this is only one embodiment. However, the honeycomb cells 75 inside the incorporated part 70 have both inlet holes 73 on the first external wall 78E and outlet holes 76 on the second external wall 78I.

Figure 8:
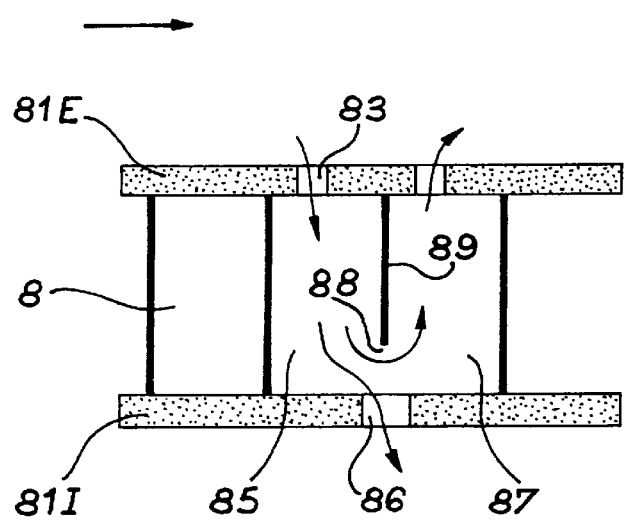

The seventh embodiment depicted by FIG. 8 involves two adjacent honeycomb cells 85 and 87. The first honeycomb cell 85 has an inlet hole 83 in the first external wall 81E, whilst the second honeycomb cell 87 has an outlet hole 83 which is also in the first external wall 81E. This embodiment is distinguished by the presence of an outlet hole 86 in the second external wall 81I in the common partition 89, in which there is also a communication hole 88 between the two honeycomb cells 85 and 87. This embodiment is particularly well suited to acoustic sandwich panels which already have the holes 83 in the first external wall 81E. In fact, a hole 86 simply needs to be made between the two honeycomb cells 85 and 87, in the second external wall 81I, to a depth which is sufficient to machine the communication hole 88 between the two honeycomb cells 85 and 87 in the internal partition 89 at the same time.

The embodiments shown in FIGS. 6 and 8 may be used when the first external wall 81E is subjected to a non-uniform external pressure. The ventilation may therefore flow out either on the first external wall 61E, 81E side, or towards the second external wall 61I, 81I, by using the change in the pressures either side of the panel.

The holes may or may not be of uniform dimensions, and they may be cylindrical, conical, milled or open ended in shaped.

Figure 9:
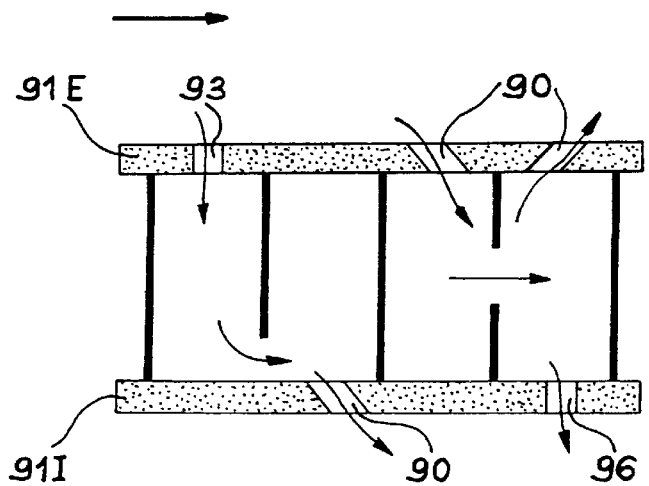

With reference to FIG. 9, the holes may be in a normal direction to the external walls 91E and 91I, as the first hole 93 and the last hole 96. However, as the holes 90, they may be oblique to these external walls so as to optimize the ventilation, acoustics and/or aerodynamics of the panel.

Figure 10:
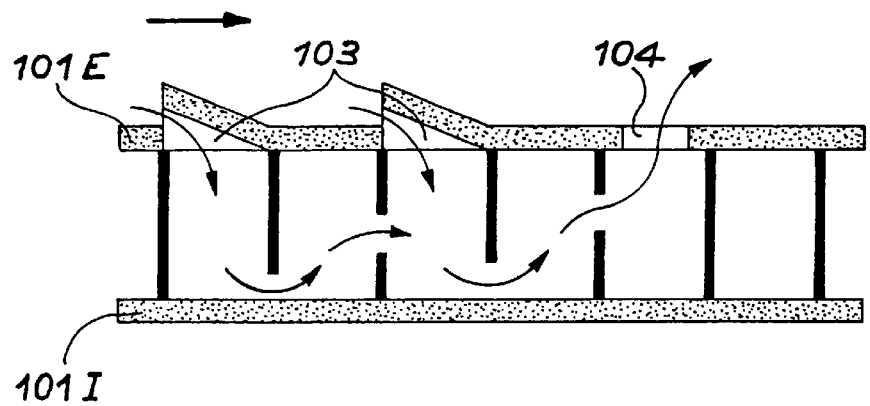

With reference to FIG. 10, it is advantageous to open up the inlet holes 103 in the first external wall 101E so that these inlet holes 103 resemble small scoops. In other words, these inlet holes 103 are formed in such a way that part of the first external wall 101E is raised on the upstream side of each of the inlet holes 103 in relation to the direction of the air flow represented by the arrows. Therefore, each inlet hole 103 has every chance of capturing the majority of the air flow which circulates along the surface of the first external wall 101E to draw it into the panel, between this first external wall 101E and the second internal wall 101I. The flow leaves via the outlet holes 104 on one of these two walls 101E or 101I.

Figure 11:
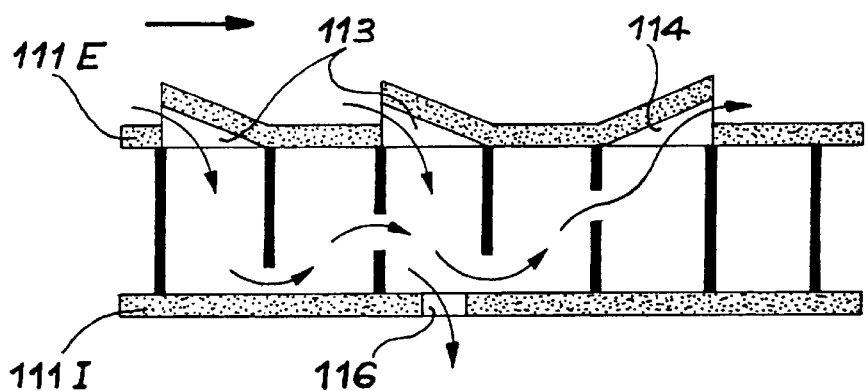

With reference to FIG. 11, which resembles FIG. 10, the outlet holes 114 may also be arranged in a similar way to the inlet holes 113, which is to say in the shape of small scoops. In this case, the direction of this scoop shape is reversed so that the opening of the outlet hole 114 is on the downstream side of this outlet hole 114 to make it easier for the air flow to leave, from the inside of the panel to the outside of the first external surface 111E. There may also be outlet holes 116 of normal shape.

Figure 12:
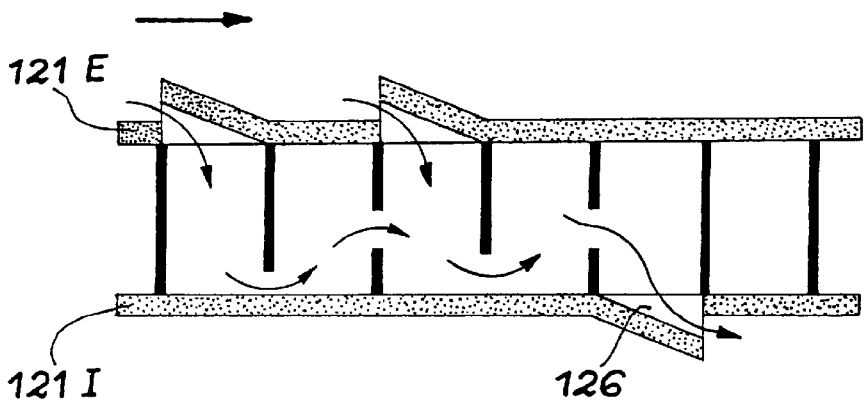

With reference to FIG. 12, it is however possible to position these outlet holes 126 on the second external wall 120I, with the same shape to those of FIG. 11 with the reference 114.

Figure 13:
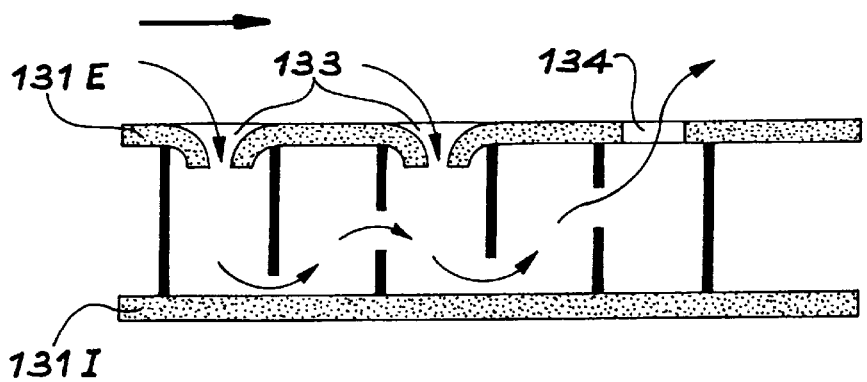

With reference to FIG. 13, the inlet holes 133 in the first external wall 131E have a bell mouthed shape, widening to the outside of the panel, so that the entry to these inlet holes 133 has a large diameter and favours the entry of part of the air circulating, as indicated by the arrow shown in bold, from left to right along the panel.

In the embodiment depicted in this FIG. 13, the first external wall 131E has been indented, by stamping for example, on these inlet holes 139, so that this first external wall 131E is partially indented on each inlet hole 133 towards the inside of the panel. In other terms, the inlet holes 133 are funnel shaped.

Figure 14:
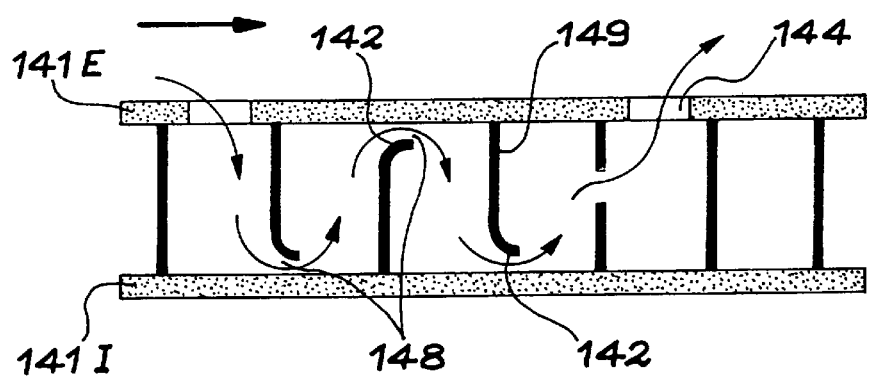

With reference to FIG. 14, it is also possible to modify the communication holes 148 in the internal partitions 149 between each honeycomb cell. In fact, these communication holes may have a shape similar to that of the inlet holes 133 of FIG. 13, which is to say bell mouthed. The internal partition 149 is, in this case, indented or stamped. The edge of the internal partition 149 is therefore indented in the downstream direction and forms a sort of curved lip 142. Furthermore, in the case of these communication holes 148 being positioned near to the external walls 141E and 141I, the air flow passing through the inside of the panel tends to pass along the internal surfaces of the external walls 141E and 141I when passing through these communication holes 148. This helps to cool these external walls.

Figure 15:
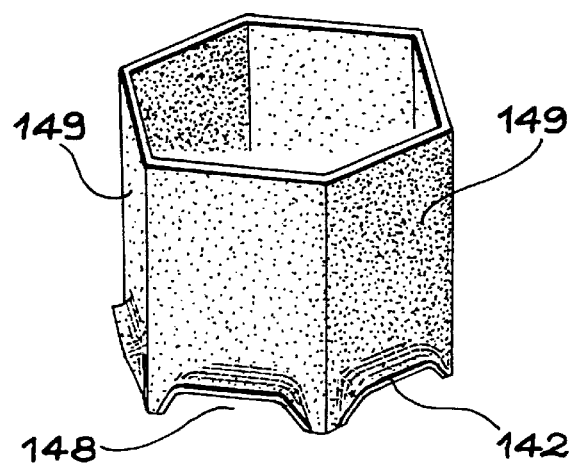

FIG. 15 shows the embodiment of a cell with internal partitions 149 which each have, at one of their ends, a communication hole 148. In this embodiment, the partition has been slightly indented at the position of the communication hole 148, or bent back as shown by the presence of the curved lips 142. This technique of creating the communication holes 148 is also known as "flared flange technology". It may be observed that the cell shown has six internal partitions. This is only one embodiment, which is particularly used for honeycomb cell sandwich panels.

This technique, illustrated by the various embodiments that have been described above, may be used for a single layer sandwich panel just as they may be used for a multi-layer sandwich panel, as well as for an acoustic sandwich panel optimized by lateral perforations.

In certain embodiments, for example those of FIGS. 3, 4, 5, 8, 9 and 14, communication holes between two adjacent honeycomb cells may be positioned near to the wall. This allows the ventilatory flow circulating in these honeycomb cells to flow along the wall and thus improve the cooling of it.

The positioning and direction of these various holes allow the direction of the air flow through the panel to be controlled.

These embodiments apply to epoxy resin impregnated composite material panels, metallic panels or metal/composite panels.

Within the scope of the use of the sandwich panels for the wall separating the cold air flow from the hot air flow in a turbojet engine, it may be noted that the embodiments of this invention generally do not cause any disturbance to the flow, especially the cold flow.

It should be noted that, according to the application it is used for, the sandwich panel needs to be more or less ventilated. Within the scope of its use in a turbojet engine, some of the areas to be ventilated are hotter than others. To make a service temperature uniform over a large area of a same sandwich panel, increased ventilation is required in these areas, either by means of more perforations in the external walls and cells, or by increasing the size of these holes, to suit the air circulation measured. The result is that in a same panel, irregularly sized holes are often to be found.

Taking into account the differences in pressure which exist either side of a sandwich panel used in the partition separating the hot and cold flows of a turbojet engine and also from one area to another, the ventilation may be more or less forced. In this case, the disposition of certain inlet and outlet holes, or even communication holes, could therefore be particularly efficient in order to allow a high flow rate or a high flow speed. The shape and number of the holes may thus be adapted to suit the air flow parameters in the engine stream, particularly for the differences in pressure along the wall of the engine cowl.

Furthermore, it may also be noted that, in its ventilatory path through the panel, the air is heated and improves the acoustic properties of the honeycomb cell sandwich panel.

When the outlet holes for the air flow through the panel are in a supersonic area of the cold flow of a turbojet engine, this can help to reduce the drag of the turbojet engine pod.

Finally, if it is prohibited to install ventilation in the upper half of the engine compartment of a turbojet engine, due to the possible risk of causing a fire to spread, the embodiments of this invention provide ventilation whose communication holes would allow such a fire to be contained.

What is claimed is:

1. A cell panel for thermal ventilation comprising:
a first wall comprising raised portions which define openings;
a second wall;
a plurality of partition walls, each of said partition walls being connected to said first and second walls to define a plurality of cells.

2. The cell panel according to claim 1, wherein the plurality of cells are hexagonally shaped.

3. The cell panel according to claim 1, wherein the first wall further comprises non-raised portions which define holes.

4. The cell panel according to claim 1, wherein the plurality of partition walls define communication holes between adjacent cells.

5. The cell panel according to claim 1, wherein the raised portions define openings located upstream of an air flow flowing outside said first wall.

6. The cell panel according to claim 5, wherein the first wall further comprises raised portions which define openings located downstream of said air flow.

7. The cell panel according to claim 5, wherein the second wall comprises raised portions which define openings located downstream of said air flow.

8. The cell panel according to claim 1, wherein the raised portions define openings having a scoop shape.

9. In a thermal ventilation cell panel having a first wall defining openings, a second wall, and a plurality of partition walls connected between said first and second walls and defining cells, the improvement comprising:
the second wall defining openings, whereby air flows in the cells through the openings defined by the first wall and out of the cells through the openings defined by the second wall, and
the first wall defining oblique openings.

10. The cell panel of claim 9, wherein the partition walls define communication holes between the cells.

11. The cell panel of claim 9, wherein:
the first wall defines openings in a first set of said cells;
the second wall defines openings in a second set of said cells; and
the partition walls define communication holes between adjacent cells, whereby air flows in a cell of said first set, through said communication holes and out of a cell of said second set.

12. The cell panel of claim 9, wherein the second wall defines one opening per cell which is offset from an opening defined by the first wall in a same cell.

13. The cell panel of claim 9, wherein the partition walls define communication holes between the cells; and
each said opening defined by the second wall is common to two adjacent cells.

14. In a thermal ventilation cell panel having a first wall defining openings, a second wall, and a plurality of partition walls connected between said first and second walls and defining cells, the improvement comprising:
the second wall defining openings, whereby air flows in the cells through the openings defined by the first wall and out of the cells through the openings defined by the second wall, and
the second wall defining oblique openings.

15. In a thermal ventilation cell panel having a first wall defining openings a second wall, and a plurality of partition walls connected between said first and second walls and defining cells, the improvement comprising:
the partition walls defining communication holes between at least one of the cells, and
the partition walls which define the communication holes comprising a curved lip.

16. The cell panel of claim 14, wherein the partition walls define communication holes between the cells.

17. The cell panel of claim 14, wherein:
the first wall defines openings in a first set of said cells;
the second wall defines openings in a second set of said cells; and
the partition walls define communication holes between adjacent cells, whereby air flows in a cell of said first set, through said communication holes and out of a cell of said second set.

18. The cell panel of claim 14, wherein the second wall defines one opening per cell which is offset from an opening defined by the first wall in a same cell.

19. The cell panel of claim 14, wherein the partition walls define communication holes between the cells; and
each said opening defined by the second wall is common to two adjacent cells.

20. In a thermal ventilation cell panel having a first wall defining openings, a second wall, and a plurality of partition walls connected between said first and second walls and defining cells, the improvement comprising:
the partition walls defining communication holes between at least one of the cells, and
the first wall defining openings having a funnel shape.

* * * * *